(12) United States Patent
Deeba et al.

(10) Patent No.: US 9,126,182 B2
(45) Date of Patent: Sep. 8, 2015

(54) CATALYZED SOOT FILTERS, SYSTEMS AND METHODS OF TREATMENT

(75) Inventors: Michel Deeba, East Brunswick, NJ (US); M. Shahjahan Kazi, Kendall Park, NJ (US)

(73) Assignee: BASF Corporation, Florham Park, NJ (US)

(*) Notice: Subject to any disclaimer, the term of this patent is extended or adjusted under 35 U.S.C. 154(b) by 603 days.

(21) Appl. No.: 13/361,427

(22) Filed: Jan. 30, 2012

(65) Prior Publication Data

US 2013/0195741 A1 Aug. 1, 2013

(51) Int. Cl.
*B01J 21/16* (2006.01)
*B01J 23/04* (2006.01)
*B01J 21/06* (2006.01)
*B01J 23/14* (2006.01)
*B01J 23/20* (2006.01)
*B01J 23/34* (2006.01)
*F01N 3/035* (2006.01)
*B01D 53/94* (2006.01)
*F01N 3/10* (2006.01)
*B01J 37/03* (2006.01)
*B01J 23/72* (2006.01)
*B01J 35/04* (2006.01)

(52) U.S. Cl.
CPC ............. *B01J 21/063* (2013.01); *B01D 53/944* (2013.01); *B01J 21/066* (2013.01); *B01J 21/16* (2013.01); *B01J 23/04* (2013.01); *B01J 23/14* (2013.01); *B01J 23/20* (2013.01); *B01J 23/34* (2013.01); *B01J 23/72* (2013.01); *B01J 35/04* (2013.01); *B01J 37/038* (2013.01); *F01N 3/035* (2013.01); *F01N 3/103* (2013.01); *B01D 2255/2022* (2013.01); *B01D 2255/2045* (2013.01); *B01D 2255/2073* (2013.01); *B01D 2255/2092* (2013.01); *B01D 2255/2094* (2013.01); *B01D 2255/20707* (2013.01); *B01D 2255/20715* (2013.01); *B01D 2255/9155* (2013.01); *B01D 2258/012* (2013.01)

(58) Field of Classification Search
CPC .. B01D 53/94; B01D 53/9413; B01D 53/944; B01D 53/945; B01D 53/9454; B01D 2255/91; B01D 2255/102; B01D 2255/202; B01D 2255/2022; B01D 2255/2045; B01D 2255/20707; B01D 2255/70715; B01D 2255/2073; B01D 2255/20761; B01D 2255/209; B01D 2255/2092; B01D 2255/2094; B01D 2255/40; B01D 2255/407; B01D 2255/65; B01D 2255/915; B01D 2255/9155; B01J 21/04; B01J 21/06; B01J 21/16; B01J 21/063; B01J 21/066; B01J 23/04; B01J 23/14; B01J 23/20; B01J 23/34; B01J 23/72; B01J 37/0244; B01J 37/0248; B01J 37/038
USPC ......... 423/212, 213.2; 502/80, 300, 324, 325, 502/330, 344, 345, 346, 349, 350, 352, 502/353; 422/180, 171, 172; 60/297, 299, 60/301, 311
See application file for complete search history.

(56) References Cited

U.S. PATENT DOCUMENTS 7,138,358 B2 * 11/2006 Huang et al. .................. 502/326
7,189,375 B2 * 3/2007 Molinier et al. .............. 422/171

(Continued)

FOREIGN PATENT DOCUMENTS

EP 1295637 3/2003
WO WO-2005/051523 6/2005

*Primary Examiner* — Colleen Dunn
(74) *Attorney, Agent, or Firm* — Servilla Whitney LLC

(57) ABSTRACT

Catalyzed soot filters comprising a wall flow monolith having a washcoat comprising an alkali base metal composite disposed on the monolith. Methods of manufacturing and using catalyzed soot filters and diesel engine exhaust emission treatment systems are also disclosed.

19 Claims, 1 Drawing Sheet

(56) References Cited

U.S. PATENT DOCUMENTS

| | | |
|---|---|---|
| 2005/0095188 A1* | 5/2005 | Matsumoto et al. ....... 423/213.2 |
| 2006/0162317 A1 | 7/2006 | Twigg et al. |
| 2007/0028604 A1 | 2/2007 | Twigg et al. |
| 2007/0219088 A1 | 9/2007 | Chigapov et al. |
| 2007/0245724 A1 | 10/2007 | Dubkov et al. |
| 2008/0095682 A1* | 4/2008 | Kharas et al. .............. 423/239.1 |

* cited by examiner

CATALYZED SOOT FILTERS, SYSTEMS AND METHODS OF TREATMENT

TECHNICAL FIELD

Catalyzed soot filters for diesel engine exhaust emissions systems and methods for their manufacture and use are disclosed. Specific embodiments are directed to soot filters comprising an alkali base metal composite on an alkali resistant substrate.

BACKGROUND

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals and combinations thereof, are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$. The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way, a catalyzed soot filter (CSF) or catalyzed diesel particulate filter (CDPF) is effective in providing for >80% particulate matter reduction along with passive burning of the accumulating soot, and thereby promoting filter regeneration.

Conventional processes for coating diesel particulate filters on aluminum titanate and cordierite substrates often negatively impact the physical properties of the coated filter as compared to uncoated filters. It is believed that soluble and fine particles enter microcracks during the washcoating process. As a result, material in the microcracks limits the free movement of the microcracks and reduces the flexibility of the filter expansion upon heating. To minimize this issue, a polymer passivation step is used prior to washcoating the substrate. An example of such a polymer passivation step is described in U.S. Pat. No. 7,166,555. This polymer passivation step increases manufacturing cost and complexity. Accordingly, it would be desirable to provide methods for manufacturing catalyzed soot filters that do not require polymer passivation prior to washcoating.

SUMMARY

One or more embodiments of the invention are directed to catalytic articles comprising a substrate having a washcoat disposed on the substrate. The washcoat comprises an alkali base metal composite. In detailed embodiments, the substrate is substantially free of silica.

In detailed embodiments, the catalytic article comprises substantially no platinum group metal. In specific embodiments, the catalytic article is effective to burn soot at temperatures below about 600° C. In certain embodiments, the catalytic article is effective to burn soot at temperatures in the range of about 500° to about 550° C.

In some embodiments, the substrate is resistant to alkali attack. In detailed embodiments, the substrate is selected from the group consisting of aluminum titanates, calcium titanates, titanium, sintered metals and combinations thereof. In certain embodiments, at least a portion of the substrate comprises manganese and substantially no platinum group metal.

In one or more embodiments, the alkali base metal composite is selected from the group consisting of $KTiO_3$, $K_2TiO_3$, $KSnO_3$, $K_2SnO_3$, $KNbO_3$, $K_2O \cdot Al_2O_3$ and combinations thereof. In specific embodiments, the substrate has an alkali base metal composite loading in the range of about 0.25 g/in$^3$ to about 2.5 g/in$^3$. In detailed embodiments, the substrate comprises a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end.

Additional embodiments of the invention are directed to catalytic articles comprising a substrate with a washcoat layer on the substrate. The washcoat layer comprises a base metal oxide on a support. In detailed embodiments, the catalytic article comprises substantially no platinum group metal. In specific embodiments, the base metal oxide is selected from the group consisting of $ZrO_2$, $TiO_2$, $ZrO_2$—$TiO_2$, calcined clay, copper/alumina and combinations thereof. In certain embodiments, the substrate has a base metal oxide loading in the range of about 0.25 g/in$^3$ to about 2.5 g/in$^3$.

The substrate of some embodiments comprises a wall flow monolith having a plurality of longitudinally extending passages formed by longitudinally extending walls bounding and defining said passages. The passages comprise inlet passages having an open inlet end and closed outlet end, and outlet passages having a closed inlet end and an open outlet end.

Additional embodiments of the invention are directed to methods of treating an exhaust gas stream emitted by a diesel engine, the exhaust gas stream containing soot. The method comprises filtering at least some of the soot from the exhaust gas stream using a soot filter comprising an alkali resistant substrate. The soot is combusted by oxidation with an alkali base metal composite supported on the alkali resistant substrate. In detailed embodiments, the soot is combusted substantially without a platinum group metal. In specific embodiments, the alkali base metal composite is selected from the group consisting of $KTiO_3$, $K_2TiO_3$, $KSnO_3$, $K_2SnO_3$, $KNbO_3$, $K_2O.Al_2O_3$ and combinations thereof. In certain embodiments, the alkali resistant substrate is selected from the group consisting of aluminum titanates, calcium titanates, titanium, sintered metals and combinations thereof. In one or more embodiments, the soot is combusted at a temperature in the range of about 500° to about 550° C.

Further embodiments of the invention are directed to an exhaust treatment system comprising a diesel engine and a soot filter. The soot filter is disposed downstream of and in flow communication with the diesel engine. The soot filter comprises an alkali resistant substrate with a washcoat composition including an alkali base metal composite. Some embodiments further comprise at least one additional catalyst located downstream of the engine, upstream of the soot filter and in flow communication with both. One or more embodiments further comprise at least one additional catalyst located downstream of and in flow communication with the soot filter. In specific embodiments, the alkali base metal composite is selected from the group consisting of $KTiO_3$, $K_2TiO_3$, $KSnO_3$, $K_2SnO_3$, $KNbO_3$, $K_2O.Al_2O_3$ and combinations thereof. In certain embodiments, the alkali resistant substrate is selected from the group consisting of aluminum titanates, calcium titanates, titanium, sintered metals and combinations thereof.

DETAILED DESCRIPTION

Figure 1:
FIG. 1 shows a perspective view of a wall flow filter substrate.

Before describing several exemplary embodiments of the invention, it is to be understood that the invention is not limited to the details of construction or process steps set forth in the following description. The invention is capable of other embodiments and of being practiced or being carried out in various ways.

The following terms shall have, for the purposes of this application, the respective meanings set forth below.

"Platinum group metal" and "platinum group metal components" refer to platinum group metals or one of their oxides.

"Rare earth metal components" refer to one or more oxides of the lanthanum series defined in the Periodic Table of Elements, including lanthanum, cerium, praseodymium and neodymium.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relate to another component.

"Alkali base metal composite" refers to an ionic composition including an alkali metal (e.g., lithium, sodium and potassium) with a base metal (e.g., iron, tin, titanium and niobium).

As used in this specification and the appended claims, the singular forms "a", "an" and "the" include plural referents unless the context clearly indicates otherwise. Thus, for example, reference to "a catalyst" includes a mixture of two or more catalysts, and the like.

Aspects of the invention pertain to soot filters, diesel engine exhaust treatment systems including a soot filter and methods of treating diesel engine exhaust. Specifically, embodiments of the invention utilize different catalytic materials capable of lower soot combustion temperatures by about 150-200° C. compared to non-catalyzed soot combustion. Embodiments, of the invention can be applied to methods of combusting soot (carbon) in many applications including Light and Heavy Duty vehicles. Uncatalyzed soot combusts at about 700° C., however, the use of materials described in embodiments of this invention allow for soot combustion temperatures lower than about 500° C. to about 550° C. Embodiments of the invention contain different families of catalytic materials: (1) alkali base metal composites that lower soot combustion temperature by about 150-200° C. compared to reference such as cordierite, alumina, or a platinum group metal on alumina; (2) supported base metal oxides (BMO) (e.g., $Ag_2O$) on supports such as $ZrO_2$, $TiO_2$, $ZrO_2$—$TiO_2$, calcined clay, Cu/alumina; (3) use of transition metal oxides such as in (2) in combination with other materials that oxidize NO to $NO_2$, such as metal supported catalysts (e.g., Mn, Mo, Ni, Cu, Co and Fe) that aid in the soot combustion by oxidation of NO to $NO_2$; and (4) use of filters that are resistant to alkali metals (e.g., aluminum titanates, titanium filters and sintered metal filters).

New materials based on alkali metal salts were found to reduce the soot combustion temperature by about 150° C. Without limiting the scope of the invention, some of the most effective materials are $K_2TiO_2$ and $K_2SnO_3$. These materials, when mixed with soot or soot/lube oil, burned soot at temperatures as low as 500-550° C. compared to 650-700° C. for soot combustion on reference materials (Cordierite) using TGA/DTA. However, one of the disadvantages of applying such materials on cordierite or SiC filters is the possible interaction of potassium with the substrate which would result in deterioration in the filter durability. Consequently, one aspect of the invention uses filters made of alkali metal resistant materials such as aluminum titanates, calcium titanates, titanium and sintered metal substrates, to name a few. Combustion here is mainly due to oxidation using $O_2$.

One or more embodiments of the invention are directed to catalytic articles comprising a substrate having a washcoat dispersed thereon. The washcoat of detailed embodiments comprises an alkali base metal composite. According to specific embodiments, the substrate is resistant to attack by alkali chemicals. The substrate of certain embodiments is selected from the group consisting of aluminum titanates, calcium titanates, titanium, sintered metals, alumina and combinations thereof. In certain embodiments, the substrate is substantially free of cordierite. In detailed embodiments, the substrate is substantially free of silica. As used in this specification and the appended claims, the term "substantially free of cordierite" and "substantially free of silica" means that there is no cordierite or silica, respectively, intentionally added to the substrate. In some specific embodiments, the alkali base metal composite is selected from the group consisting of $KTiO_3$, $K_2TiO_3$, $KSnO_3$, $K_2SnO_3$, $KNbO_3$, potassium aluminate ($K_2O.Al_2O_3$) and combinations thereof.

In detailed embodiments, the catalytic article comprises substantially no platinum group metal. As used in this specification and the appended claims, the term "substantially no platinum group metal" means that there is no intentionally added platinum group metal, or that no more than 1%, 0.5% or 0.1% of the total metal loading is a platinum group metal. In certain embodiments, the catalytic article comprises substantially no platinum, palladium or rhodium. In specific embodiments, the substrate comprises manganese.

The soot filter of detailed embodiments is effective to burn soot at temperatures below about 600° C. In detailed embodiments, catalytic article is effective to burn soot at temperatures in the range of about 500° to about 550° C. As used in this specification and the appended claims, the term "effective to burn soot" means that the catalyst or catalytic article burns at least 50% of the soot present on the filter at the specific temperature. In more specific embodiments, the catalyst or catalytic article burns at least about 60% or 70% or 80% or 90%, or in the range of about 60% to about 100% or in the range of about 70% to about 100% or in the range of about 80% to about 100% or in the range of about 90% to about 100% of the soot present on the filter at the specified temperature.

In some embodiments, the alkali base metal composite loading is in the range of about 0.25 $g/in^3$ to about 2.5 $g/in^3$.

Additional embodiments of the invention are directed to catalytic articles comprising a substrate with a washcoat layer on the substrate, the washcoat layer comprising a base metal oxide on a support. In specific embodiments the catalytic article comprises substantially no platinum group metal. The base metal oxide of detailed embodiments is selected from the group consisting of $ZrO_2$, $TiO_2$, $ZrO_2$—$TiO_2$, calcined clay, copper/alumina and combinations thereof.

In some embodiments, the base metal oxide loading is in the range of about 0.25 $g/in^3$ to about 2.5 $g/in^3$. In various embodiments, the base metal oxide loading is in the range of about 0.5 $g/in^3$ to about 2.25 $g/in^3$, or in the range of about 0.75 $g/in^3$ to about 2 $g/in^3$, in the range of about 1.25 $g/in^3$ to about 1.75 $g/in^3$. In specific embodiments the base metal oxide loading is about 1.5 $g/in^3$.

Wall flow substrates useful for supporting the catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain greater than about 250 cell per square inch, and up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness in the range of about 0.002 and 0.1 inches. Other embodiments have wall flow substrates with a wall thickness in the range of about 0.002 and 0.025 inches. Detailed embodiments have wall thicknesses in the range of about 0.010 inches to about 0.020 inches.

Figure 2:
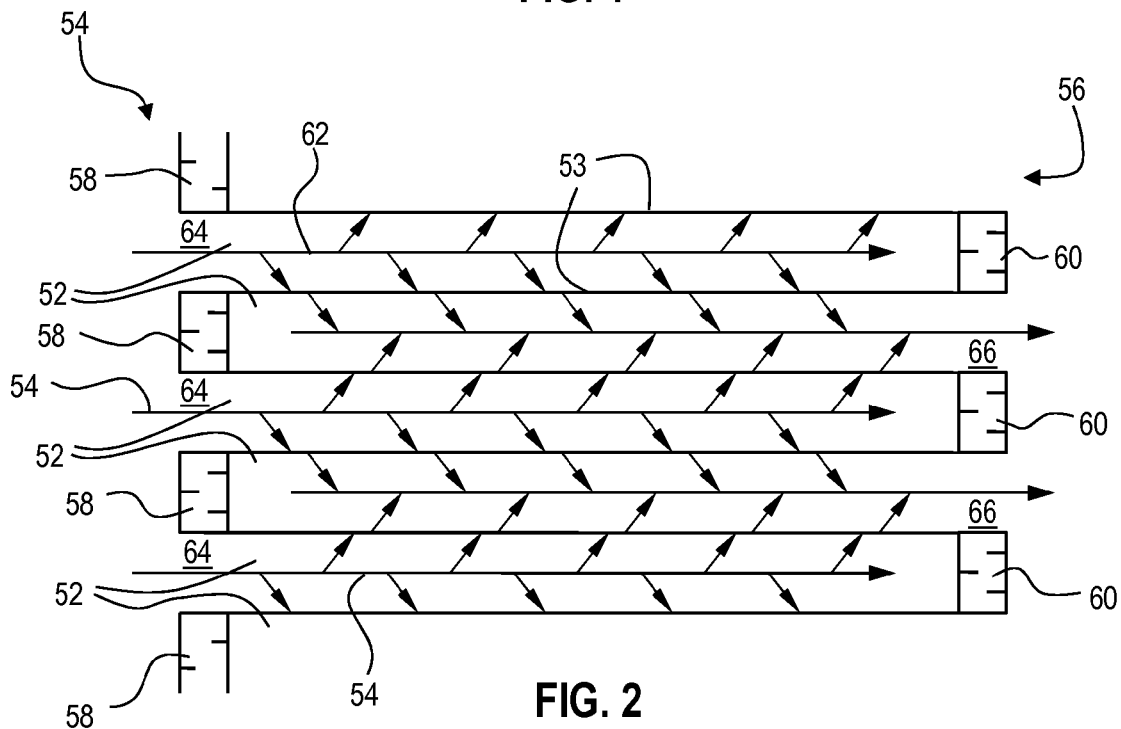
FIG. 2 shows a cutaway view of a section of a wall flow filter substrate.

FIGS. 1 and 2 illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

The support particles of some embodiments is be selected from the group consisting of aluminum compounds, zirconium compounds, cerium compounds, zeolites, silicon compounds, base metal oxides and combinations thereof.

Wall flow filter substrates, also referred to as wall flow monoliths and wall flow substrates, are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. The wall flow monolith of other embodiments is one or more of aluminum titanate, cordierite, silicon carbide, metal oxides and ceramics.

Various embodiments of the invention comprise an aluminum titanate wall flow monolith, having a porosity in the range of about 40% to about 70%. Further embodiments of this sort have a coefficient of thermal expansion that is less than about $25 \times 10^{-7}$/° C. when measured at 1000° C. More detailed embodiments have a CTE less than about $15 \times 10^{-7}$/° C. when measured at 1000° C. In other embodiments, the wall flow monolith comprises a material selected from aluminum titanate, cordierite and silicon carbide.

Coating of the wall flow substrates with catalyst composition is achieved by immersing the substrates vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300° C. to 450° C.). After calcining, the catalyst loading can determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

The catalyst is dispersed on a suitable support material such as a refractory oxide with high surface area and good thermal stability such as a high surface area aluminum oxide. Also, aluminas stabilized with a second oxide are suitable supports. Lanthana stabilization of alumina provides a suitable support for precious group metal catalysts. Also, mixtures of aluminas are suitable supports. Other aluminas that are doped or treated with oxides such as $SiO_2$, $ZrO_2$, $TiO_2$, etc. to provide stabilization or improved surface chemistries can also be utilized. Other suitable support materials include, but are not limited to, $ZrO_2$ and $TiO_2$, can be used. In addition to the support oxides discussed above, it might prove useful to include other catalytically functional oxides to incorporate into the catalytic zone. Examples of these include $CeO_2$, $Pr_6O_{11}$, $V_2O_5$, and $MnO_2$ and combinations thereof and solid solution oxide mixtures, etc. These oxides can contribute to burning of hydrocarbons, especially heavy fuel derived hydrocarbons, and deposited coke/soot derived from disproportination (i.e., dehydrogenation or oxidative dehydrogenation) of the injected fuel and in this way give additional combustion activity to the catalytic zone, plus prevent deactivation of the PGM by the deposition hydrocarbon derived coke.

Figure 3:
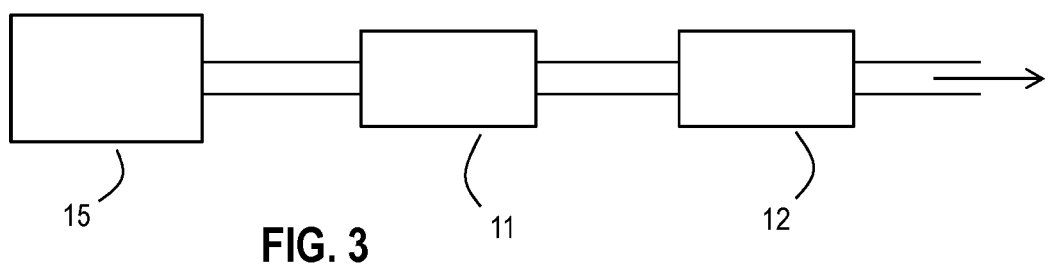
FIG. 3 shows a schematic depiction of an embodiment of an emission treatment system.

One embodiment of an emission treatment system is schematically depicted in FIG. 3. As can be seen in FIG. 3, the exhaust containing gaseous pollutants (including unburned hydrocarbons, carbon monoxide and NOx) and particulate matter is conveyed from the engine 15 to an oxidation catalyst 11. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the soot filter 12 (i.e., clogging), which is positioned downstream in the system. In addition, a substantial proportion of the NO of the NOx component is oxidized to $NO_2$ in the oxidation catalyst.

The exhaust stream is conveyed to the soot filter 12 which is coated with a catalyst composition. According to one or more embodiments, the particulate matter including the soot fraction and the VOF are also largely removed (greater than 80%) by the soot filter. The particulate matter deposited on the soot filter is combusted through the regeneration of the filter. The temperature at which the soot fraction of the particulate matter combusts is lowered by the presence of the catalyst composition disposed on the soot filter. The catalyzed soot filter 12 may optionally contain an SCR catalyst for converting the NOx in the exhaust gas stream to nitrogen.

One or more embodiments of the invention are directed to exhaust treatment systems comprising a diesel engine 15 and a soot filter 12. The soot filter 12 is located downstream of and in flow communication with the diesel engine. The soot filter 12 of specific embodiments comprises an alkali resistant substrate with a washcoat composition that includes an alkali base metal composite.

Detailed embodiments of the emissions treatment system include comprising at least one additional catalyst located downstream of the engine, upstream of the soot filter and in flow communication with both. An exemplary emissions treatment system of this sort is shown in FIG. 3, where the additional catalyst can be a diesel oxidation catalyst. Further detailed embodiments of the emissions treatment system include at least one additional catalyst located downstream of and in flow communication with the soot filter. In some embodiments, the additional catalyst is one or more of a SCR catalyst, an ammonia oxidation catalyst, a soot filter (catalyzed or uncatalyzed), trapping/storage catalyst, reductant injectors, air injectors and combinations.

Further embodiments of the invention are directed to methods of treating an exhaust gas stream emitted by a diesel engine. The diesel engine emits an exhaust gas stream containing soot. At least some of the soot is filtered from the exhaust gas stream using a soot filter comprising an alkali resistant substrate. The soot is combusted by oxidation with an alkali base metal composite supported on the alkali resistant substrate. In specific embodiments, the soot is combusted substantially without a platinum group metal.

EXAMPLES

Reference throughout this specification to "one embodiment," "certain embodiments," "one or more embodiments" or "an embodiment", means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalytic article comprising a substrate having a washcoat disposed on the substrate, the washcoat comprising an alkali base metal composite including an alkali metal and a base metal selected from iron, tin, titanium and niobium, the substrate being substantially free of silica, wherein the catalytic article contains no more than 0.1% of a platinum group metal and is effective to burn soot at temperatures below about 600° C.

2. The catalytic article of claim 1, wherein the substrate is resistant to alkali attack.

3. The catalytic article of claim 1, wherein the catalytic article comprises no intentionally added platinum group metal.

4. The catalytic article of claim 1, wherein the catalytic article is effective to burn soot at temperatures in the range of about 500° to about 550° C.

5. The catalytic article of claim 1, wherein the substrate is selected from the group consisting of aluminum titanates, calcium titanates, titanium, sintered metals and combinations thereof.

6. The catalytic article of claim 1, wherein the alkali base metal composite is selected from the group consisting of $KTiO_3$, $K_2TiO_3$, $KSnO_3$, $K_2SnO_3$, $KNbO_3$, $K_2O.Al_2O_3$ and combinations thereof.

7. The catalytic article of claim 1, wherein at least a portion of the substrate comprises manganese and substantially no platinum group metal.

8. The catalytic article of claim 1, wherein the substrate has an alkali base metal composite loading in the range of about 0.25 $g/in^3$ to about 2.5 $g/in^3$.

9. The catalytic article of claim 1, wherein the substrate comprises a wall flow monolith having a plurality of longitudinally extending passages formed by longitudinally extending walls bounding and defining said passages, the passages comprising inlet passages having an open inlet end and closed outlet end, and outlet passages having a closed inlet end and an open outlet end.

10. A method of treating an exhaust gas stream emitted by a diesel engine, the exhaust gas stream containing soot, the method comprising:
filtering at least some of the soot from the exhaust gas stream using a soot filter comprising an alkali resistant substrate; and
combusting the soot by oxidation with an alkali base metal composite supported on the alkali resistant substrate.

11. The method of claim 10, wherein the soot is combusted substantially without a platinum group metal.

12. The method of claim 10, wherein the alkali base metal composite is selected from the group consisting of $KTiO_3$, $K_2TiO_3$, $KSnO_3$, $K_2SnO_3$, $KNbO_3$, $K_2O.Al_2O_3$ and combinations thereof.

13. The method of claim 10, wherein the alkali resistant substrate is selected from the group consisting of aluminum titanates, calcium titanates, titanium, sintered metals and combinations thereof.

14. The method of claim 10, wherein the soot is combusted at a temperature in the range of about 500° to about 550° C.

15. An exhaust treatment system comprising:
a diesel engine; and
a soot filter disposed downstream of and in flow communication with the diesel engine, the soot filter comprising an alkali resistant substrate with a washcoat composition including an alkali base metal composite including an alkali metal and a base metal selected from iron, tin, titanium and niobium, wherein the catalytic article contains no more than 0.1% of a platinum group metal and is effective to burn soot at temperatures below about 600° C.

16. The exhaust treatment system of claim 15, further comprising at least one additional catalyst located downstream of the engine, upstream of the soot filter and in flow communication with both.

17. The exhaust treatment system of claim 15, further comprising at least one additional catalyst located downstream of and in flow communication with the soot filter.

18. The exhaust treatment system of claim 15, wherein the alkali base metal composite is selected from the group consisting of $KTiO_3$, $K_2TiO_3$, $KSnO_3$, $K_2Sn0_3$, $KNbO_3$, $K_2O.Al_2O_3$ and combinations thereof.

19. The exhaust treatment system of claim 15, wherein the alkali resistant substrate is selected from the group consisting of aluminum titanates, calcium titanates, titanium, sintered metals and combinations thereof.

* * * * *